(12) United States Patent
Perreault et al.

(10) Patent No.: US 10,218,289 B2
(45) Date of Patent: *Feb. 26, 2019

(54) STACKED SWITCHED CAPACITOR ENERGY BUFFER CIRCUIT

(71) Applicant: MASSACHUSETTS INSTITUTE OF TECHNOLOGY, Cambridge, MA (US)

(72) Inventors: David J. Perreault, Brookline, MA (US); Khurram K. Afridi, Lexington, MA (US); Minjie Chen, Cambridge, MA (US); Steven B. Leeb, Belmont, MA (US); Arthur Hsu Chen Chang, Irvine, CA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 1268 days.

This patent is subject to a terminal disclaimer.

(21) Appl. No.: 14/360,992

(22) PCT Filed: Jan. 17, 2013

(86) PCT No.: PCT/US2013/021886
§ 371 (c)(1),
(2) Date: May 28, 2014

(87) PCT Pub. No.: WO2013/109719
PCT Pub. Date: Jul. 25, 2013

(65) Prior Publication Data
US 2014/0355322 A1    Dec. 4, 2014

Related U.S. Application Data

(60) Provisional application No. 61/594,990, filed on Feb. 3, 2012, provisional application No. 61/587,308, filed on Jan. 17, 2012.

(51) Int. Cl.
*H02M 3/06*     (2006.01)
*H02M 7/537*    (2006.01)
(Continued)

(52) U.S. Cl.
CPC ............. *H02M 7/537* (2013.01); *H01G 4/30* (2013.01); *H01G 4/38* (2013.01); *H02J 5/00* (2013.01);
(Continued)

(58) Field of Classification Search
CPC ........ H02M 7/537; H02M 7/217; H01G 4/30; H01G 4/38; H02J 5/00; Y02T 10/7022
(Continued)

(56) References Cited

U.S. PATENT DOCUMENTS 5,561,597 A    10/1996    Limpaecher
5,744,988 A    4/1998     Condon et al.
(Continued)

FOREIGN PATENT DOCUMENTS

WO    WO 2013/109719 A1    7/2013
WO    WO 2013/109743 A2    7/2013
(Continued)

OTHER PUBLICATIONS

U.S. Appl. No. 14/758,033, filed Jun. 26, 2015, Perreault, et al.
(Continued)

*Primary Examiner* — Richard Tan
(74) *Attorney, Agent, or Firm* — Daly, Crowley, Mofford & Durkee, LLP

(57) ABSTRACT

A stacked switched capacitor (SSC) energy buffer circuit includes a switching network and a plurality of energy storage capacitors. The switching network need operate at only a relatively low switching frequency and can take advantage of soft charging of the energy storage capacitors to reduce loss. Thus, efficiency of the SSC energy buffer
(Continued)

circuit can be extremely high compared with the efficiency of other energy buffer circuits. Since circuits utilizing the SSC energy buffer architecture need not utilize electrolytic capacitors, circuits utilizing the SSC energy buffer architecture overcome limitations of energy buffers utilizing electrolytic capacitors. Circuits utilizing the SSC energy buffer architecture (without electrolytic capacitors) can achieve an effective energy density characteristic comparable to energy buffers utilizing electrolytic capacitors. The SSC energy buffer architecture exhibits losses that scale with the amount of energy buffered, such that a relatively high efficiency can be achieved across a desired operating range.

8 Claims, 14 Drawing Sheets

(51) Int. Cl.
    *H01G 4/38* (2006.01)
    *H02M 7/217* (2006.01)
    *H01G 4/30* (2006.01)
    *H02J 5/00* (2016.01)

(52) U.S. Cl.
    CPC ......... *H02M 7/217* (2013.01); *Y02T 10/7022* (2013.01)

(58) Field of Classification Search
    USPC ....................................................... 307/109
    See application file for complete search history.

(56) References Cited

U.S. PATENT DOCUMENTS

| | | | |
|---|---|---|---|
| 6,198,645 B1 | 3/2001 | Kotowski et al. | |
| 6,834,001 B2 | 12/2004 | Myono | |
| 7,279,957 B2 | 10/2007 | Yen | |
| 7,535,133 B2 | 5/2009 | Perreault et al. | |
| 7,589,605 B2 | 9/2009 | Perreault et al. | |
| 7,834,971 B2* | 11/2010 | Chen ................. | G02F 1/136286 349/139 |
| 7,889,519 B2 | 2/2011 | Perreault et al. | |
| 8,026,763 B2 | 9/2011 | Dawson et al. | |
| 8,212,541 B2 | 7/2012 | Perreault et al. | |
| 8,451,053 B2 | 5/2013 | Perreault et al. | |
| 8,503,203 B1 | 8/2013 | Szczeszynski et al. | |
| 8,718,188 B2 | 5/2014 | Balteanu et al. | |
| 8,824,978 B2 | 9/2014 | Briffa et al. | |
| 8,829,993 B2 | 9/2014 | Briffa et al. | |
| 8,830,710 B2 | 9/2014 | Perreault et al. | |
| 9,374,020 B2* | 6/2016 | Perreault ................ | H01G 4/38 |
| 9,762,145 B2* | 9/2017 | Perreault .............. | H02M 7/537 |
| 2004/0125618 A1 | 7/2004 | DeRooij et al. | |
| 2005/0162144 A1 | 7/2005 | Kernahan | |
| 2005/0213267 A1* | 9/2005 | Azrai ...................... | H02M 3/07 361/15 |
| 2005/0286206 A1 | 12/2005 | Togashi et al. | |
| 2005/0286278 A1 | 12/2005 | Perreault et al. | |
| 2007/0253235 A1* | 11/2007 | Felber ................. | H01L 23/5286 365/62 |
| 2008/0032473 A1* | 2/2008 | Bocek ..................... | H01G 9/28 438/253 |
| 2008/0265586 A1 | 10/2008 | Like et al. | |
| 2009/0002066 A1* | 1/2009 | Lee ........................ | H03H 15/02 327/554 |
| 2009/0059630 A1 | 3/2009 | Williams | |
| 2010/0073081 A1* | 3/2010 | Moon ............... | H03H 11/1291 327/554 |
| 2010/0080023 A1 | 4/2010 | Jain | |
| 2010/0126550 A1 | 5/2010 | Foss | |
| 2010/0237710 A1 | 9/2010 | Fagg et al. | |
| 2011/0026281 A1 | 2/2011 | Chapman et al. | |
| 2011/0193515 A1 | 8/2011 | Wu et al. | |
| 2011/0221346 A1 | 9/2011 | Lee et al. | |
| 2011/0221398 A1* | 9/2011 | Ferber, Jr. ............ | H02J 7/0016 320/166 |
| 2011/0273020 A1 | 11/2011 | Balachandreswaran et al. | |
| 2012/0119676 A1 | 5/2012 | Yao | |
| 2013/0241625 A1 | 9/2013 | Perreault et al. | |
| 2014/0120854 A1 | 5/2014 | Briffa et al. | |
| 2014/0167513 A1 | 6/2014 | Chang et al. | |
| 2014/0313781 A1 | 10/2014 | Perreault et al. | |
| 2014/0339918 A1* | 11/2014 | Perreault .................. | H01G 4/38 307/109 |
| 2015/0023063 A1 | 1/2015 | Perreault et al. | |
| 2015/0084701 A1 | 3/2015 | Perreault et al. | |
| 2016/0079965 A1* | 3/2016 | Afridi ..................... | H02M 7/00 327/108 |

FOREIGN PATENT DOCUMENTS

| | | |
|---|---|---|
| WO | WO 2013/109797 A1 | 7/2013 |
| WO | WO 2013/116814 A1 | 8/2013 |

OTHER PUBLICATIONS

U.S. Appl. No. 14/791,685, filed Jul. 6, 2015, Perreault, et al.
U.S. Appl. No. 14/837,616, filed Aug. 27, 2015, Briffa, et al.
U.S. Appl. No. 14/823,220, filed Aug. 11, 2015, Barton, et al.
U.S. Appl. No. 14/934,760, filed Nov. 6, 2015, Briffa, et al.
U.S. Appl. No. 14/920,031, filed Oct. 22, 2015, Briffa, et al.
U.S. Appl. No. 14/968,045, filed Dec. 14, 2015, Perreault et al.
U.S. Appl. No. 14/974,563, filed Dec. 18, 2015, Perreault et al.
U.S. Appl. No. 14/975,742, filed Dec. 19, 2015, Perreault et al.
Notice of Allowance dated Feb. 29, 2016 corresponding to U.S. Appl. No. 14/233,912; 18 Pages.
Notice of Allowance dated Mar. 30, 2016; for U.S. Appl. No. 14/232,103; 17 pages.
U.S. Appl. No. 15/149,491, filed May 9, 2016, Perreault, et al.
U.S. Appl. No. 15/290,402, filed Oct. 11, 2016, Perreault, et al.
U.S. Appl. No. 15/287,068, filed Oct. 6, 2016, Briffa, et al.
U.S. Appl. No. 15/354,170, filed Nov. 17, 2016, Briffa, et al.
Office Action dated Dec. 30, 2016 from U.S. Appl. No. 14/362,163; 41 Pages.
Response to Office Action dated Dec. 30, 2016 from U.S. Appl. No. 14/362,163, filed Mar. 30, 2017; 15 Pages.
Chang et al.; "A Systems Approach to Photovoltaic Energy Extraction;" 27th Annual IEEE Applied Power Electronics Conference and Exposition; Feb. 5-9, 2012; 18 pages.
Pease; "What's All This Common-Centroid Stuff, Anyhow?;" Electronic Design; Oct. 1, 1996; 4 pages.
PCT Search Report and Written Opinion of the ISA dated May 31, 2013; for PCT Pat. App. No. PCT/US2013/21886; 12 pages.
U.S. Appl. No. 14/416,654, filed Jan. 23, 2015, Perreault, et al.
U.S. Appl. No. 14/416,737, filed Feb. 11, 2015, Perreault, et al.
U.S. Appl. No. 14/401,981, filed Nov. 18, 2014, Perreault.
U.S. Appl. No. 14/435,914, filed Apr. 15, 2015, Perreault, et al.
Notice of Allowance dated Jun. 19, 2017 from U.S. Appl. No. 14/362,163; 11 Pages.
PCT Search Report and Written Opinion of the ISA dated May 3, 2013 for International Application No. PCT/US2013/22001; 15 pages.
PCT Search Report and Written Opinion of the ISA dated Jun. 10, 2013 for International Application No. PCT/US2013/24552; 14 pages.
PCT Search Report and Written Opinion of the ISA dated Jul. 26, 2013 for International Application No. PCT/US2013/21926; 16 pages.
PCT International Preliminary Report on Patentability dated Jul. 31, 2014 for International Application No. PCT/US2013/021886; 9 pages.
PCT International Preliminary Report on Patentability dated Jul. 31, 2014 for International Application No. PCT/US2013/021926; 9 pages.

(56) References Cited

OTHER PUBLICATIONS

PCT International Preliminary Report on Patentability dated Jul. 31, 2014 for International Application No. PCT/US2013/022001; 9 pages.
PCT International Preliminary Report on Patentability dated Aug. 14, 2014 for International Application No. PCT/US2013/024552; 11 pages.

* cited by examiner

STACKED SWITCHED CAPACITOR ENERGY BUFFER CIRCUIT

This application is a U.S. National Stage entry under 35 U.S.C. § 371 of PCT Application No. PCT/US2013/021886, filed Jan. 17, 2013 and published in the English language and, which claims the benefit of U.S. provisional application No. 61/587,308 filed Jan. 17, 2012, and U.S. provisional application No. 61/594,990 filed Feb. 3, 2012, which applications are hereby incorporated herein by reference in their entireties.

BACKGROUND

As is known in the art, power conversion systems that interface between direct current (DC) and single-phase alternating current (AC) require an energy storage capability (or an energy buffer) which provides buffering between a constant power desired by a DC source or a load and a continuously varying power desired for a single-phase AC system.

As is also known, the flow to and from such an energy buffer is at twice the line frequency (e.g., 120 Hz in the United States). The buffering energy requirement can be calculated as $E_{buf} = P/\omega_{line}$. Because the energy storage requirement of the buffer is proportional to the system average power (P) and the (relatively long) line period ($T=2\pi/\omega$), the size of the required energy buffer cannot be reduced simply through increases in switching frequency of an interface power converter. Thus, energy buffering requirements represent a significant limitation on miniaturization of grid interface systems.

One important consideration associated with twice-line-frequency energy buffering relates to lifetime and reliability. Conventional power conversion systems typically utilize electrolytic capacitors to provide high-density energy storage for buffering. It is, however, widely appreciated that despite providing the best available energy density and providing small DC bus voltage variation, electrolytic capacitors also represent a significant source of system lifetime and reliability problems. Also, electrolytic capacitors can only be operated over a narrow charge/discharge range at 120 Hz for thermal and efficiency reasons (i.e., associated with RMS current limits and efficiency requirements). These considerations directly limit the energy buffering capability of electrolytic capacitors at 120 Hz. Thus, while typical peak energy storage densities of up to 0.9 J/cm$^3$ can be achieved with electrolytic capacitors, the allowable energy swing at 120 Hz yields practical energy densities that are about an order of magnitude lower. Hence, the development of energy buffering circuits that eliminate electrolytic capacitors while maintaining high energy storage density and high efficiency is one important requirement to achieving future grid interface systems that have both a small size and a high reliability.

It is known that film capacitors have a reliability and lifetime which is higher than electrolytic capacitors, but it is also known that film capacitors have considerably lower peak energy density than electrolytic capacitors (by an order of magnitude).

However, because film capacitors can be efficiently charged and discharged over a much wider voltage range compared with charge/discharge voltage ranges of electrolytic capacitors, for 120 Hz buffering, energy densities similar to those achieved with practical systems which utilize electrolytic capacitors can be achieved with high-reliability film capacitors, so long as a wide variation of the capacitor voltage can be used.

One approach to develop energy buffering circuits that eliminate electrolytic capacitors utilizes active filter blocks (essentially bidirectional DC-DC converters). The active filter block approach effectively utilizes film capacitors while maintaining a desired narrow-range bus voltage. While this approach is flexible in terms of it use, it unfortunately leads to low buffering efficiency if high power density is to be maintained, due to losses in the active filter.

Other systems have incorporated the required energy buffering as part of the operation of the grid interface power stage. This approach can offset a portion of the buffering loss associated with introduction of a complete additional power conversion stage, but still introduces high-frequency loss and is quite restrictive in terms of operation and application.

As is also known in the prior art, energy buffering can be employed in many non-line-frequency applications where there is a energy transferred between a first source or load having a slow rate of varying power and/or a limited instantaneous power rating (perhaps a dc source or load) and a second source or load that has a component of power that varies faster and/or to an instantaneous value larger than that desired to be sourced or absorbed by the first source or load. For example, such applications include interfacing a battery system (which is desired to be efficiently charged or discharged at a limited rate and with a limited peak power) to a mechanical system that requires rapidly varying power flow and perhaps large peak power (e.g., by using a power converter driving an electromechanical system such as a motor). In such a system, an energy buffer is desired to provide the local-time difference between the power sourced or absorbed by the first source or load and the second source or load (e.g., the difference between that desired for the battery and that required by the power converter and motor for the mechanical system). In such applications, an energy buffer may be provided by an ultracapacitor or energy buffer system including one or more ultracapacitors. Applications requiring energy buffering of the nature described here may include, without limitation, motor drives, electric and hybrid vehicle drive trains, cranes, renewable energy systems including wind and wave energy systems, active filter and reactive power compensation systems, traction systems, laser driver systems, electromagnetic launch systems, electromagnetic guns, electromagnetic brakes and propulsion systems, and power systems for implanted medical devices.

SUMMARY

In accordance with the concepts, systems, circuits and techniques described herein, a stacked switched capacitor (SSC) energy buffer circuit comprises a plurality of series-connected blocks of switches and capacitors. The capacitors are preferably of a type that can be efficiently charged and discharged over a wide voltage range over a buffering time period of interest (e.g., film capacitors for line-frequency applications, and electrolytic capacitors or ultracapacitors for mechanical system time scale applications). Thus, selection of the particular capacitor type and characteristics depends, at least in part, upon the particular application and the buffering time period. In some embodiments, ultracapacitors or electrolytic capacitors could be used. The switches are disposed to selectively couple the capacitors to enable dynamic reconfiguration of both the interconnection among the capacitors and their connection to a buffer port. The switches are cooperatively operated as a switching network such that the voltage seen at the buffer port varies only over a small range as the capacitors charge and discharge over a wide range to buffer energy.

With this particular arrangement, an energy buffer circuit having an effective energy density which is relatively high compared with the effective energy density of conventional energy buffer circuits is provided. In some embodiments, efficiency can be extremely high because the switching network need operate at relatively low (e.g. line-scale) switching frequencies, and the system can take advantage of soft charging or adiabatic charging of the energy storage capacitors to reduce loss. Moreover, the stacked switched capacitor buffer architecture described herein exhibits losses that reduce as energy buffering requirements reduce such that high efficiency can be achieved across an entire desired operating range.

In accordance with a further aspect of the concepts, systems, circuits and techniques described herein a grid interface power converter comprises an first filter having a first port adapted to receive an input voltage from a DC source, a resonant high frequency isolated DC-DC converter having a first port coupled to a second port of the first filter, a resonant high frequency inverter having a first port coupled to a second port of the resonant high frequency isolated DC-DC converter and having a second port coupled to a first port of a second filter with the second filter having a second port adapted to receive an input voltage from a AC source. The grid interface power converter further comprises a stacked switched capacitor (SSC) energy buffer circuit coupled between the second port of the resonant high frequency isolated DC-DC converter and the first port of the resonant high frequency inverter. By appropriately modifying switch states of the SSC energy buffer circuit, the SSC energy buffer circuit absorbs and delivers energy over a wide individual capacitor voltage range, while maintaining a narrow-range voltage at the input port. This enables maximal utilization of the energy storage capability.

In accordance with a further aspect of the concepts, systems, circuits and techniques described herein a grid interface power converter comprises a DC-DC converter having a first port adapted to connect to a DC source or load, a DC-AC converter having a first port coupled to a second port of the DC-DC converter and having a second port adapted to connect to a AC source or load. The grid interface power converter further comprises a stacked switched capacitor (SSC) energy buffer circuit coupled between the second port of the DC-DC converter and the first port of the DC-AC converter. By appropriately modifying switch states of the SSC energy buffer circuit, the SSC energy buffer circuit absorbs and delivers energy over a wide individual capacitor voltage range, while maintaining a narrow-range voltage at the input port. This enables relatively high utilization, and in some cases maximal utilization, of the energy storage capability.

With this particular arrangement, an energy buffering approach applicable to a wide range of grid-interface power electronic applications is provided. Grid-interface power electronic applications include but are not limited to photovoltaic inverters, motor drives, power supplies, off-line LED drivers and plug-in hybrid electric vehicle chargers. Use of the energy buffering approach described herein results in improved reliability and lifetime in these and other applications.

In one embodiment, a stacked switched capacitor (SSC) energy buffer circuit includes a switching network comprised of a plurality of switches and a plurality of energy storage capacitors which may be provided as film capacitors. Switches in the switching network are configured to selectively couple at least one of the energy storage capacitors in series across a bus voltage. The switching network need operate at only a relatively low switching frequency, and the system can take advantage of soft charging of the energy storage capacitors to reduce loss. Thus, efficiency of the SSC energy buffer circuit can be extremely high compared with the efficiency of other energy buffer circuits. Furthermore, since circuits utilizing the SSC energy buffer architecture need not utilize electrolytic capacitors, circuits utilizing the SSC energy buffer architecture overcome limitations of energy buffers which do utilize electrolytic capacitors. Furthermore, circuits utilizing the SSC energy buffer architecture (but not using utilizing electrolytic capacitors) can achieve an effective energy density characteristic comparable to energy buffers which utilize electrolytic capacitors. In some cases, circuits using the SSC energy buffer architecture, either with or without electrolytic capacitors, can achieve higher effective energy than a circuit using electrolytic capacitors alone for the same voltage ripple. Moreover, the SSC energy buffer architecture exhibits losses that scale with the amount of energy that must be buffered, such that a relatively high efficiency can be achieved across a desired operating range.

In accordance with a further aspect of the concepts, systems, circuits and techniques described herein, a stacked switched capacitor (SSC) energy buffer circuit having first and second terminals includes a first sub-circuit comprising one or more capacitors, a second sub-circuit comprising one or more capacitors and one or more switches disposed in at least one of said first and second sub-circuits. The one or more switches are cooperatively operated to selectively couple the one or more capacitors within and/or between the first and second sub-circuits. In a first operating mode, the first and second sub-circuits are serially coupled and the one or more switches are operable to enable dynamic reconfiguration of how the capacitors are coupled to the terminals of the sub-circuit.

In one embodiment, the one or more switches are operable to dynamically reconfigure the interconnection among the capacitors within at least one of said first and second sub-circuits.

In one embodiment, in at least some operating modes of the SSC energy buffer circuit, the one or more switches are operable to prevent the capacitors from ever being connected together at both terminals.

BRIEF DESCRIPTION OF THE DRAWINGS

FIG. 1A is circuit diagram of a parallel-series switched capacitor circuit.

FIGS. 1 and 1C are circuit diagrams of two configurations associated with FIG. 1A for different switch states.

DETAILED DESCRIPTION

Figure 1:
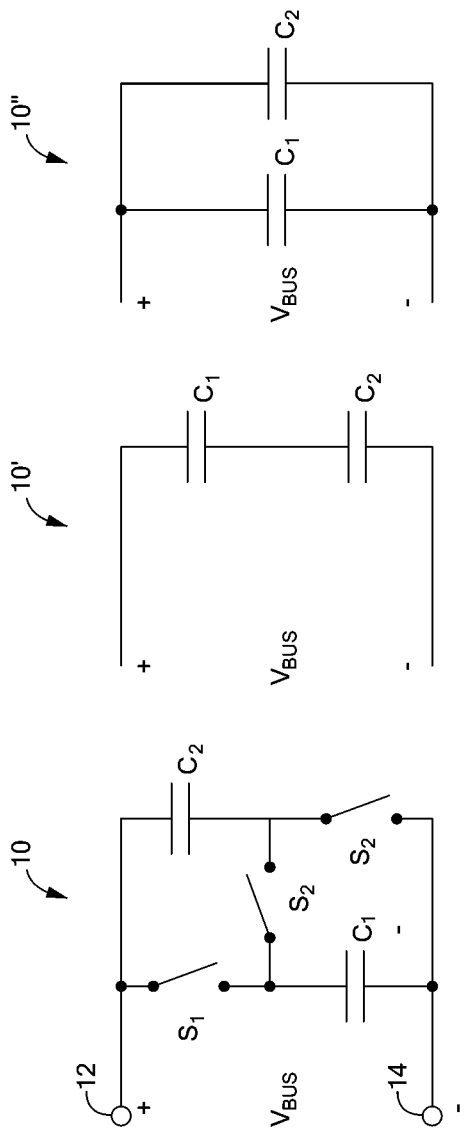

Described herein is a switched capacitor structure referred to herein as stacked switched capacitor (SSC) energy buffer circuit. Although reference is sometimes made herein to use of an energy buffer circuit in a particular application, it should be appreciated that the energy buffer circuits, concepts and techniques described herein find use in a wide variety of applications. For example, many applications exist in which an energy buffer is used because either a peak power rating or a desired energy transfer rating of a first source or load is different from that of the source or load to which it interfaces. It should be recognized that the concepts, systems, circuits and techniques described herein can be used in these applications to achieve one or more of: higher energy density/smaller size at a given voltage variation level, higher reliability by using more desirable energy storage elements.

The SSC energy buffer circuit provides a small variation of a bus voltage, $V_{bus}$ while also providing high utilization of available peak energy storage capacity. In one embodiment, a variation of 12.5% or less is provided while providing utilization of available peak energy storage capacity of 72.7% or better. The SSC energy buffer circuit and related techniques described herein achieves extremely high efficiency (e.g., by using film capacitors) and uses simpler circuitry. The SSC energy buffer circuit and related techniques described herein achieves extremely high energy density e.g., by incorporating film capacitors, electrolytic capacitors or ultracapacitors and employing them over a wider voltage range than appears at the input port. The SSC energy buffer circuit and related techniques described herein provide performance characteristics comparable to or better than conventional energy buffer circuits while at the same time utilizing fewer switches and capacitors than conventional energy buffer circuits. The SSC energy buffer circuit includes a number of variations as will be described herein.

Referring to FIGS. 1A to 1C, switched capacitor circuits that reconfigure capacitors between parallel and series combinations have been used to improve the energy utilization of ultracapacitors. A circuit 10 is a simple version of a parallel-series switched capacitor circuit. The circuit 10 includes switches $S_1$, $S_2$, $S_3$ and two capacitors $C_1$ and $C_2$. The circuit 10 also includes a terminal 12 and a terminal 14 (collectively referred to herein as a buffer port) to provide a bus voltage, $V_{bus}$, cross the terminals 12, 14. When switches $S_1$ and $S_3$ are open and $S_2$ is closed, the resulting configuration is represented by a circuit 10' as shown in FIG. 1B depicting capacitors $C_1$ and $C_2$ in series. When switches $S_1$ and $S_3$ are closed and $S_2$ is open, the resulting configuration is represented by a circuit 10" shown in FIG. 1C depicting capacitors $C_1$ and $C_2$ in parallel.

While the circuit 10 has a high capacitor energy utilization of 93.75% which is relatively high compared with prior art approaches, the circuit 10 also has a voltage ripple ratio of 33.3% which is also relatively high compared with prior art approaches. That is, the value of the bus voltage, $V_{bus}$, varies by as much as 33.3%. For example, in one embodiment, the voltage of the dc bus varies from $0.67V_{nom}$ to $1.33V_{nom}$ where $V_{nom}$ is the average (nominal) value of the bus voltage. More complex parallel-series switched capacitor circuits have also been developed which achieve a better voltage ripple ratio; however, these complex parallel-series switched capacitors have high circuit complexity when high energy utilization and small voltage ripple are required. For example, a circuit currently having among the best performance (e.g., a 8-6-5-4-3 parallel-series switched capacitor circuit) has an energy utilization of 92.09% and a voltage ripple ratio of 14.3%, but requires 41 switches and 120 capacitors making the circuit relatively complicated and thus relatively difficult to implement for use in practical circuits and systems.

Figure 2:
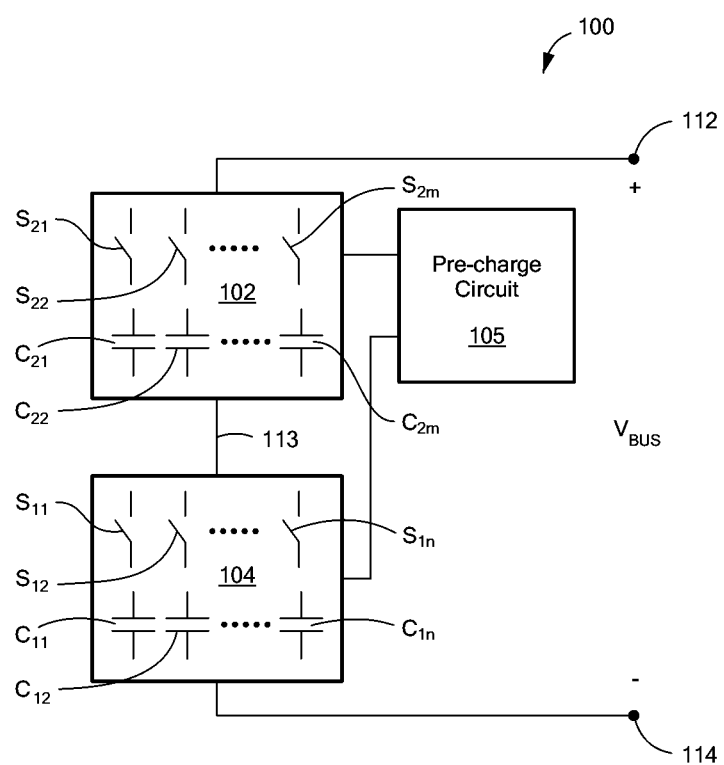
FIG. 2 is a circuit diagram of a stacked switched capacitor (SSC) energy buffer circuit.

Referring to FIG. 2, a stacked switched capacitor (SSC) energy buffer circuit 100 overcomes the deficiencies of the switched capacitor circuits like that of the circuit 10 (FIG. 1). The SSC energy buffer circuit 100 includes a first set of circuitry 102 and a second set of circuitry 104 connected in series. SSC energy buffer circuit 100 further includes a pre-charge circuit 105. For reasons which will become apparent from the description provided herein below, pre-charge circuit 105 is coupled to each of the two sub-circuits 102, 104 and pre-charge circuit 105 is operable to charge each of one or more capacitors in two sub-circuits 102, 104 to specified initial conditions before entering a first operating mode. In some cases, the pre-charge circuit 105 may be coupled in series with each of the two sub-circuits 102, 104 before entering a first operating mode, and further connections of the pre-charge circuit 105 to capacitors within the two sub-circuits 102, 104 may be made with switches in the two sub-circuits 102, 104

The circuit 100 also includes a terminal 112, a terminal 113 and a terminal 114. Terminals 112, 114 collectively form a buffer port to provide the bus voltage, $V_{BUS}$. Each set of circuitry 102, 104 includes capacitors.

As illustrated in FIG. 2, the first set of circuitry 102 includes capacitors $C_{11}, C_{12}, \ldots, C_{1n}$ and the second set of circuitry 104 includes capacitors $C_{21}, C_{22}, \ldots, C_{2m}$ where n and m are integers greater than or equal to one. The capacitors $C_{11}, C_{12}, \ldots, C_{1n}, C_{21}, C_{22}, \ldots, C_{2m}$, are of a type that can be efficiently charged and discharged over a wide voltage range (e.g., film capacitors electrolytic capacitors and ultra capacitors).

Each set of circuitry also includes switches. As illustrated in FIG. 2, the first set of circuitry 102 includes switches $S_{11}$, $S_{12}, \ldots, S_{1n}$ and the second set of circuitry 104 includes switches $S_{21}, S_{22}, \ldots, S_{2m}$ connected in series with a respective one capacitor. For example, the switch $S_{11}$ is in series with the capacitor $C_{11}$, the switch $S_{12}$ is in series with the capacitor $C_{12}$, the switch $S_{21}$ is in series with the capacitor $C_{21}$, the switch $S_{22}$ is in series with the capacitor $C_{22}$ and so forth. The switches $S_{11}, S_{12}, \ldots, S_{1m}$ and $S_{21}$, $S_{22}, \ldots, S_{2n}$ enable dynamic reconfiguration of both the interconnection among the capacitors and their connection to the buffer port to provide the bus voltage, $V_{bus}$.

Figure 4:
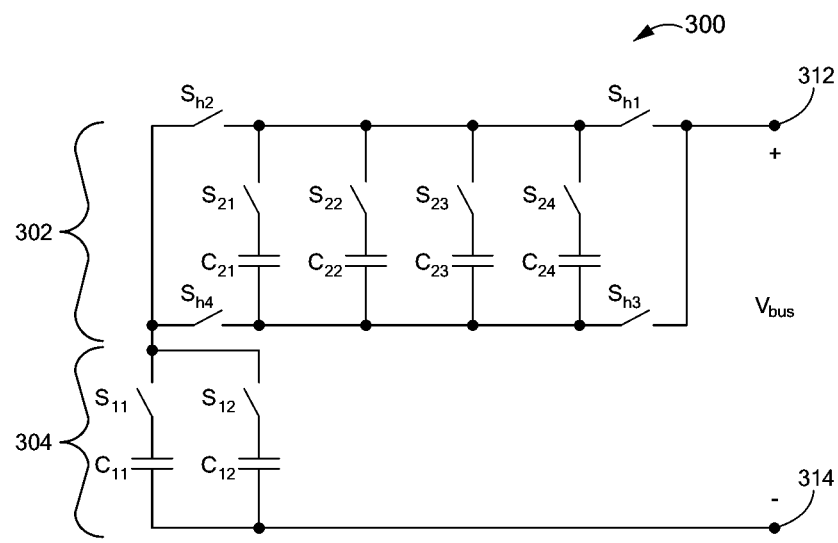
FIG. 4 is a circuit diagram of an example of the SSC energy buffer circuit called a 2-4 bipolar SSC energy buffer circuit.
Figure 6:
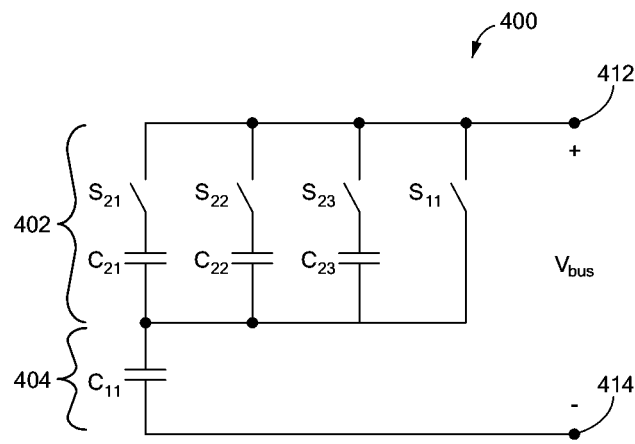
FIG. 6 is a circuit diagram of another example of the SSC energy buffer circuit called a 1-3 unipolar SSC energy buffer circuit.

It should, of course, be appreciated that in some implementations there is no one-to-one correspondence between capacitors and switches, that is, a "leg" can be just a capacitor as $C_{11}$ is in FIG. 6, just a switch as $S_{11}$ is in FIG. 6, or a switch in series with a capacitor as in many cases. Also one of the blocks can have switches not associated with a "leg" to allow the "legs" of that block to be connected in reverse, as $S_{h1}, S_{h2}, S_{h3}$ and $S_{h4}$ do in FIG. 4.

The switching in the circuit 100 (i.e., opening and closing of the switches) is preferably performed such that the voltage seen at the buffer port, $V_{bus}$, varies only over a small range as the capacitors charge and discharge over a wide voltage range to buffer energy, thereby providing a high effective energy density. By appropriately modifying the switch states, the buffer capacitors absorb and deliver energy over a relatively wide individual voltage range, while maintaining a relatively narrow-range voltage at the input port. This enables a high degree of utilization (and in some cases, even maximal utilization) of the capacitor energy storage capability. Efficiency of the circuit 100 can be extremely high because the switches in the circuit 100 need operate at only very low (line-scale) switching frequencies. Also, the circuit 100 can take advantage of soft charging of the energy storage capacitors to reduce loss. Moreover, the circuit 100 exhibits losses that reduce as energy buffering requirements reduce such that high efficiency can be achieved across the full operating range.

Figure 3:
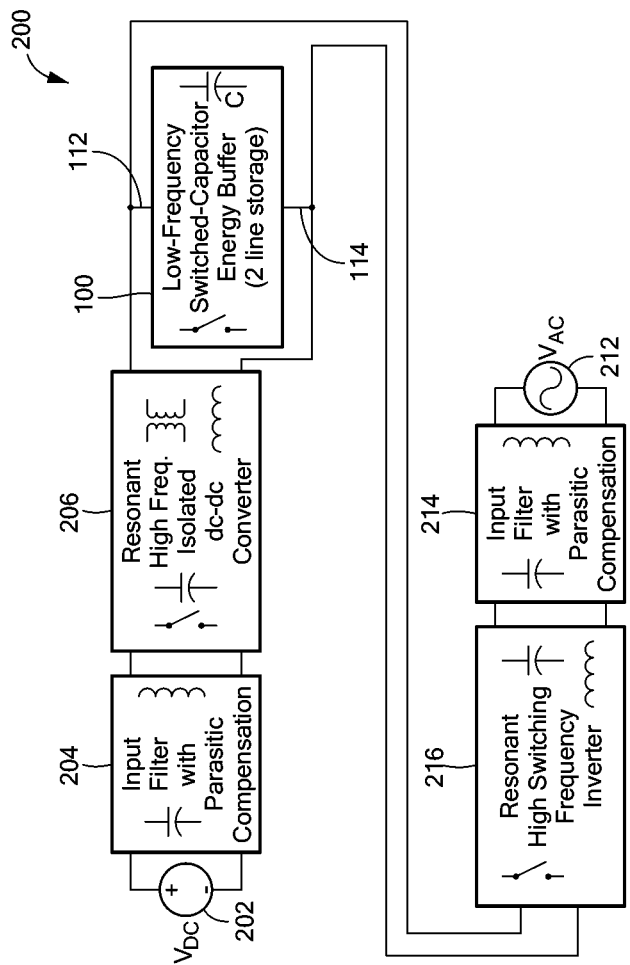
FIG. 3 is a block diagram of a grid interface power converter system using the SSC energy buffer circuit of FIG. 2.

Referring to FIG. 3, the SSC energy buffer circuit 100 may be included into a grid interface power converter system 200. The system 200 includes a DC power source 202 coupled to an input filter with parasitic compensation 204, a resonant high frequency isolated DC-DC converter 206 coupled to the SSC energy buffer circuit 100 through the terminals 112, 114 that provide the bus voltage, $V_{bus}$. The system 200 also includes an AC power source 212 coupled to an input filter with parasitic compensation 214, a resonant high frequency inverter 216 coupled to the SSC energy buffer circuit 100 through the terminals 112, 114. This energy buffering approach is applicable to a wide range of grid-interface power electronic applications (including photovoltaic inverters, motor drives, power supplies, off-line LED drivers and plug-in hybrid electric vehicle chargers and so forth), enabling improved reliability and lifetime in these applications.

Figure 3A:
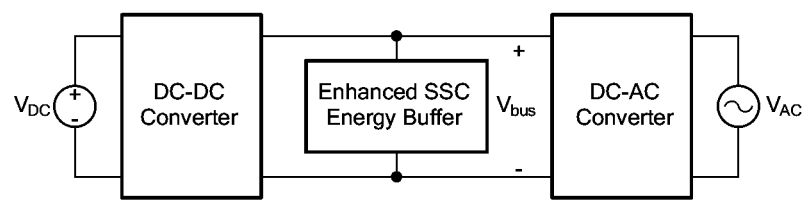
FIG. 3A is a block diagram of a general grid interface power converter system using the SSC energy buffer circuit of FIG. 2.

Referring to FIG. 3A, a grid interface power converter includes a DC-DC converter having a first port adapted to connect to a DC source or load. The grid interface power converter further includes a DC-AC converter having a first port coupled to a second port of the DC-DC converter and having a second port adapted to connect to an AC source or load. The grid interface power converter further comprises a stacked switched capacitor (SSC) energy buffer circuit coupled between the second port of the DC-DC converter and the first port of the DC-AC converter. By appropriately modifying switch states of the SSC energy buffer circuit, the SSC energy buffer circuit absorbs and delivers energy over a wide individual capacitor voltage range, while maintaining a narrow-range voltage at the input port. This enables relatively high utilization, and in some cases maximal utilization, of the energy storage capability Referring to FIG. 4, one particular example of the SSC energy buffer circuit 100 is a circuit 300 called a 2-4 bipolar SSC energy buffer circuit. The circuit 300 includes a first set of circuitry 302 and a second set of circuitry 304 in series with the first set of circuitry 302. The first set of circuitry 302 includes four "legs" each of which comprise four switches $S_{21}, S_{22}, S_{23}, S_{24}$ series coupled with respective ones of four capacitors $C_{21}, C_{22}, C_{23}, C_{24}$ (e.g., the switch $S_{21}$ is in series with the capacitor $C_{21}$, the switch $S_{22}$ is in series with the capacitor $C_{22}$, the switch $S_{23}$ is in series with the capacitor $C_{23}$, and the switch $S_{24}$ is in series with the capacitor $C_{24}$ and so forth). The capacitors $C_{21}, C_{22}, C_{23}, C_{24}$ can be in the circuit 300 in a positive or a negative manner (hence the term "bipolar").

The first circuitry 302 also includes switches $S_2, S_{h1}, S_{h3}$, $S_{h4}$ (sometimes referred herein collectively as an H-bridge) and selectively opening and closing the switches allows for bi-polar charging. The second set of circuitry 304 includes two capacitors $C_{11}, C_{12}$ and two switches $S_{11}, S_{12}$ serially coupled to a respective one of the two capacitors $C_{11}, C_{12}$ (e.g., the switch $S_{11}$ is in series with the capacitor $C_{11}$ and the switch $S_{12}$ is in series with the capacitor $C_{12}$). The circuit 300 also includes a terminal 312 and a terminal 314 that collectively form a buffer port to provide the bus voltage, $V_{bus}$.

The capacitors $C_{11}, C_{12}, C_{21}, C_{22}, C_{23}, C_{24}$ have corresponding voltages $V_{11}, V_{12}, V_{21}, V_{22}, V_{23}, V_{24}$ respectively. The capacitors $C_{11}, C_{12}, C_{21}, C_{22}, C_{23}, C_{24}$ have identical capacitance, but different voltage ratings. For example, the capacitors, $C_{11}, C_{12}$ each have a voltage rating of $13/8\ V_{nom}$, where $V_{nom}$ is the nominal value of the bus voltage, $V_{bus}$. The voltage rating of the capacitors $C_{21}, C_{22}, C_{23}, C_{24}$ are $5/8\ V_{nom}$, $4/8\ V_{nom}$, $3/8\ V_{nom}$, and $2/8\ V_{nom}$, respectively. Pre-charging circuitry (not shown in FIG. 4) ensures that the following initial voltages $V_{11}, V_{12}, V_{21}, V_{22}, V_{23}, V_{24}$ for the capacitors $C_{11}, C_{12}, C_{21}, C_{22}, C_{23}, C_{24}$ are $3/8\ V_{nom}$, $3/8\ V_{nom}$, $4/8\ V_{nom}$, $3/8\ V_{nom}$, $2/8\ V_{nom}$, and $1/8\ V_{nom}$, respectively.

Figure 5:
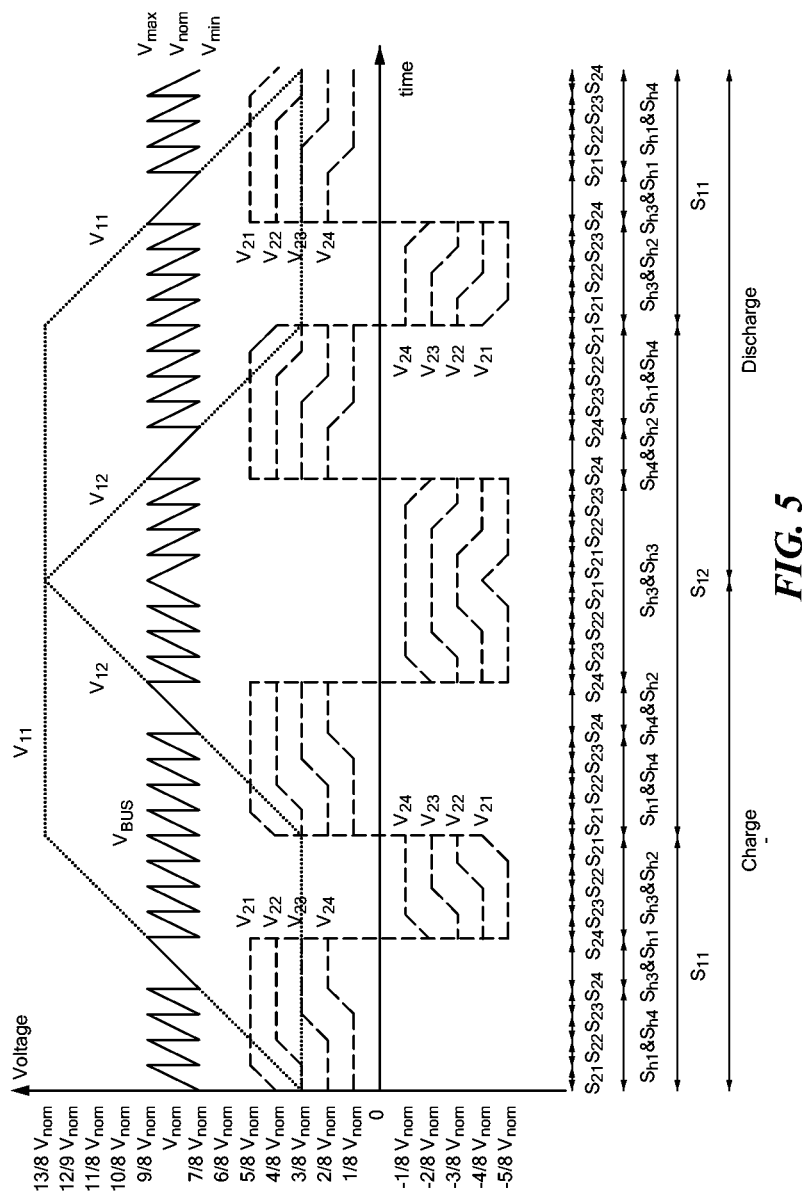
FIG. 5 is a plot of switch states vs. voltages of the circuit in FIG. 4.

Referring to FIG. 5, when the circuit 300 begins charging from its minimum state of charge, switches $S_{h1}, S_{h4}, S_{21}, S_{11}$ are turned on while switches $S_{h2}, S_{h3}, S_{12}, S_{22}, S_{23}, S_{24}$ are turned off. In the minimum state of charge, the capacitors $C_{11}, C_{21}$ are connected in series and charged until the bus voltage, $V_{bus}$, rises from $7/8\ V_{nom}$ to $9/8\ V_{nom}$. At this instant, the voltage, $V_{21}$, of the capacitor $C_{21}$ reaches $5/8\ V_{nom}$ and the voltage, $V_{11}$, of the capacitor $C_{11}$ reaches $4/8\ V_{nom}$.

Then, the switch $S_{21}$ is turned off, the switch $S_{22}$ is turned on; and the bus voltage, $V_{bus}$, drops back down to $7/8\ V_{nom}$. After a similar period of time (assuming a constant charging current) the voltage, $V_{22}$, of the capacitor $C_{22}$ reaches $4/8\ V_{nom}$ and the voltage, $V_{11}$, of the capacitor $C_{11}$ reaches $5/8\ V_{nom}$ and the bus voltage, $V_{bus}$, again reaches $9/8\ V_{nom}$.

Next, the switch $S_2$ is turned off, the switch $S_{23}$ is turned on and the capacitor $C_{23}$ is charged. This process is repeated until the capacitor $C_{24}$ is charged. At this point, the capacitor voltages $V_{11}, V_{12}, V_{21}, V_{22}, V_{23},$ and $V_{24}$, are $7/8\ V_{nom}$; $3/8$ $V_{nom}$; 5/8 $V_{nom}$; 4/8 $V_{nom}$; 3/8 $V_{nom}$; and 2/8 $V_{nom}$, respectively. The bus voltage, $V_{bus}$, is 9/8 $V_{nom}$.

Next, the capacitor $C_{11}$ is charged directly through the switches $S_{h3}$, $S_{h4}$, $S_{11}$ (with all other switches $S_{h1}$, $S_{h1}$, $S_{12}$, $S_{21}$, $S_{22}$, $S_{23}$, $S_{24}$ off) until the voltage, $V_{11}$, and the bus voltage, $V_{bus}$, reach 9/8 $V_{nom}$. Now, the switch $S_{h4}$ is turned off, and the switch $S_{h2}$ is turned on along with the switch $S_{h3}$. Hence, the bus voltage, $V_{bus}$, again drops to 7/8 $V_{nom}$.

Now, the capacitor $C_{11}$ can continue to charge up through the now negatively connected capacitors $C_{21}$, $C_{22}$, $C_{23}$, $C_{24}$ through a process similar to the one described above, except that the capacitors $C_{21}$, $C_{22}$, $C_{23}$, $C_{24}$ are discharged in reverse order, i.e., first through $C_{24}$, then through $C_{23}$, and so on until finally through $C_{21}$.

At this instant, the capacitor $C_{11}$ is fully charged to 13/8 $V_{nom}$ and charging of the capacitor $C_{12}$ must begin. For this, the H-bridge switches are toggled (i.e., the switches $S_{h2}$ and $S_{h3}$ are turned off, and the switches $S_{h1}$ and $S_{h4}$ are turned on), the switch $S_{11}$ is turned off and the switch $S_{12}$ is turned on. The charging process for the capacitor $C_{12}$ is identical to the charging process for the capacitor $C_{11}$. The switch states, the capacitor voltages (as seen from a port outside the H-bridge, e.g. terminals 312 and 313 between sub-circuit 302 and sub-circuit 304) and the resulting bus voltages, $V_{bus}$, over a complete charge and discharge cycle are shown in FIG. 5.

During the discharge period, the capacitors $C_{11}$, $C_{12}$ are discharged one at a time through a process that is the reverse of the charging process. Hence, the voltage waveforms during the discharge period are a mirror of those in the charging period. Throughout the charging and discharging period of the circuit 300, the bus voltage, $V_{bus}$, stays within the 7/8 $V_{nom}$ to 9/8 $V_{nom}$ range. Hence, the circuit 300 has a (nominal to peak) voltage ripple of 12.5%.

It is meaningful to compare various energy buffering circuits in terms of their energy buffering ratio, $\gamma_b$. An energy buffering ratio, $\gamma_b$, is a measure of how effectively a circuit makes use of the total energy storage capacity of its capacitors, $E_{rated}$. It is defined as the ratio of the energy that can be extracted in one cycle to $E_{rated}$. If an energy buffering architecture can be charged up to a maximum energy of $E_{max}$ and drained down to a minimum energy of $E_{min}$, then the energy buffering ratio, $\gamma_b$, is given by:

$$\gamma_b = (E_{max} - E_{min})/(E_{rated})$$

The exemplary circuit 300 achieves an energy buffering ratio, $\gamma_b$ of 81.6%.

Referring to FIG. 6, another example of the SSC energy buffer 100 is a circuit 400 called a 1-3 unipolar SSC energy buffer circuit. The circuit 400 includes a first set of circuitry 402 and a second set of circuitry 404. The first set of circuitry 402 includes switches $S_{21}$, $S_{22}$, $S_{23}$ connected in series to capacitors $C_{21}$, $C_{22}$, $C_{23}$, respectively, and these "legs" (switches in series with capacitors) are connected in parallel. The first set of circuitry 402 also includes a switch $S_{11}$ coupled in parallel to the capacitor switch pairs $C_{21}$-$S_{21}$, $C_{22}$-$S_{22}$ and $C_{23}$-$S_{23}$. The second set of circuitry 404 includes a capacitor $C_{11}$.

The capacitors $C_{11}$, $C_{21}$, $C_{22}$, $C_{23}$ have corresponding voltages $V_{11}$, $V_{21}$, $V_{22}$, and $V_{23}$, respectively. The capacitors $C_{11}$, $C_{21}$, $C_{22}$, $C_{23}$ have identical capacitance, but different voltage ratings: 9/8 $V_{nom}$ for $C_{11}$, 4/8 $V_{nom}$ for $C_{21}$, 3/8 $V_{nom}$ for $C_{22}$ and 2/8 $V_{nom}$ for $C_{23}$, where $V_{nom}$ is the nominal value of the bus voltage, $V_{bus}$. Most of the energy is buffered by the capacitor $C_{11}$, which also supports most of the voltage, while the capacitors $C_{21}$, $C_{22}$ and $C_{23}$ play a supportive function, by buffering a small amount of energy and providing some voltage support.

Figure 7:
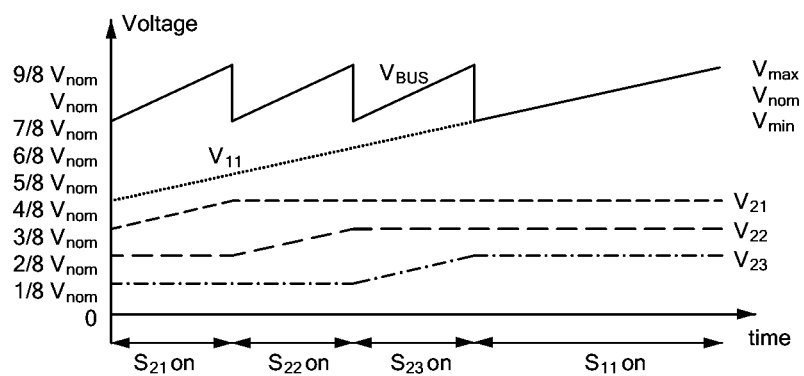
FIG. 7 is a plot of switch states vs. voltages of the circuit in FIG. 6.

FIG. 7 depicts the voltage waveforms for the capacitors $C_{11}$, $C_{21}$, $C_{22}$, $C_{23}$ during a charging period for the circuit 400. Pre-charging circuitry (not shown in FIG. 6) ensures that each of capacitors $C_{11}$, $C_{21}$, $C_{22}$, $C_{23}$ are charged to respective ones of the following initial voltages $V_{11}$, $V_{21}$, $V_{22}$ and $V_{23}$ In one embodiment, the initial voltages $V_{11}$, $V_{21}$, $V_{22}$, $V_{23}$ correspond to voltages of 4/8 $V_{nom}$; 3/8 $V_{nom}$; 2/8 $V_{nom}$; and 1/8 $V_{nom}$. Once the circuit 400 starts to charge, the switch $S_{21}$ is turned on and the other switches $S_{22}$, $S_{23}$ and $S_{11}$ are turned off. In this case, the capacitors $C_{11}$, $C_{21}$ are placed in series with each other and charged until the bus voltage, $V_{bus}$, reaches 9/8 $V_{nom}$, when the voltage, $V_{21}$, reaches 4/8 $V_{nom}$, and the voltage, $V_{11}$, reaches 5/8 $V_{nom}$. Then, the switch $S_{21}$ is turned off, the switch $S_{22}$ is turned on. After a next period of time (which may be the same as or similar to the period of time taken to charge caps $C_{11}$, $C_{21}$ assuming a constant charging current), the voltage, $V_{22}$, reaches 3/8 $V_{nom}$ and the voltage, $V_{11}$ reaches 6/8 $V_{nom}$. Then, the switch $S_{23}$ is turned on and the capacitor $C_{23}$ is charged. In this way, switches $S_{21}$, $S_{22}$, $S_{23}$, $S_{11}$ are turned on and off one after another and the voltages $V_{21}$, $V_{22}$, $V_{23}$, $V_{11}$ finally reach the voltage values 4/8 $V_{nom}$, 3/8 $V_{nom}$, 2/8 $V_{nom}$ and 9/8 $V_{nom}$, respectively. Then, the circuit 400 enters the discharging period. The switches are turned on and off in reverse order in the discharge cycle. Hence, the voltage waveforms during the discharging period are the reverse of those in the charging period (not shown in FIG. 7).

Thus, by changing the switch configurations appropriately as energy is delivered to and from the buffer port, individual capacitors can be charged/discharged over a wide range (from their initial voltages to rated voltages), while the voltage at the buffer port, $V_{bus}$, is maintained within a narrow range (within ±12.5% of $V_{nom}$) as shown in FIG. 7. It can be shown that this simple structure can provide energy buffering of up to 8/11 (~72.7%) of the peak energy storage rating of the capacitors, while providing a buffer port voltage, $V_{bus}$, that remains within ±12.5% of a nominal bus voltage, $V_{nom}$.

Figure 8:
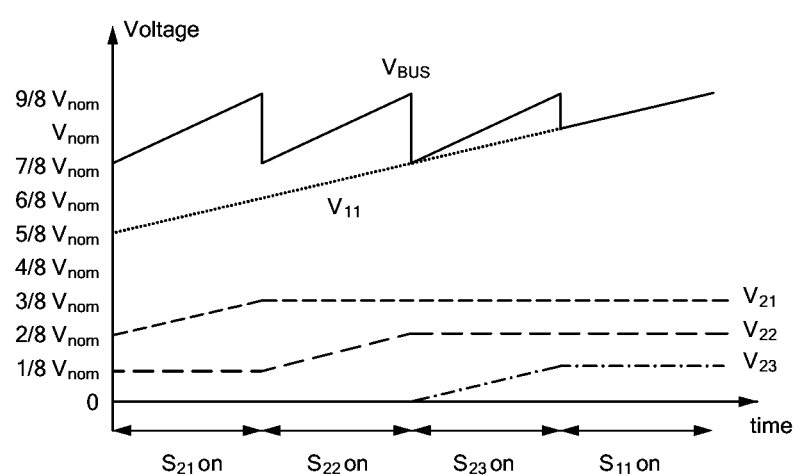
FIG. 8 is a plot of switch states vs. voltages of the circuit in FIG. 6 using a modified control.

Referring to FIG. 8, the circuit 400 can also be operated in slightly different manner. For example, unlike the control strategy depicted in FIG. 7, a different control strategy gives equal time to all four switch states. The required voltage rating of the capacitors $C_{21}$, $C_{22}$, $C_{23}$ is lower than in FIG. 7. However, with this modification the energy buffering ratio of the buffer reduces to 68.4% compared to 72.7% depicted in FIG. 7.

Figure 9:
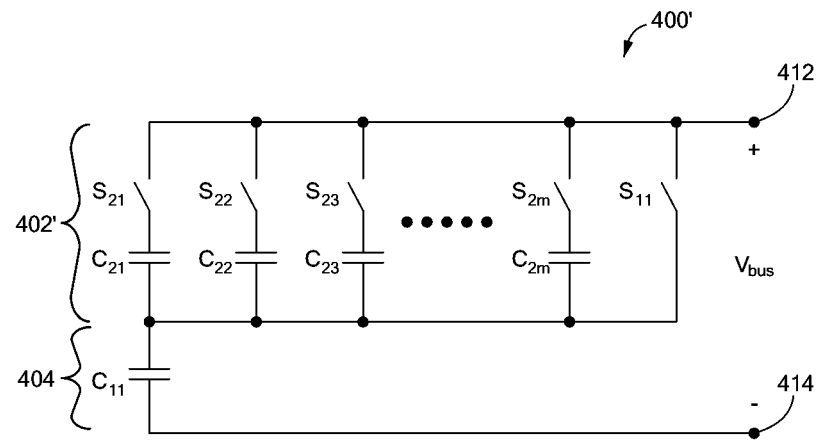
FIG. 9 is a circuit diagram of a generalized example of the SSC energy buffer circuit of FIG. 6 called a 1-m unipolar SSC energy buffer circuit.

Referring to FIG. 9, the circuit 400 can be extended to achieve a smaller bus voltage, $V_{bus}$, variation or a higher energy buffering ratio, $\gamma_b$, by adding more capacitors in parallel to the three upper capacitors, $C_{21}$, $C_{22}$, $C_{23}$, shown in the circuit 400 (FIG. 6). For example, a circuit 400' called a 1-m unipolar SSC energy buffer circuit includes a first set of circuitry 402' and the second set of circuitry 404 which includes the capacitor $C_{11}$ similar to the circuit 400. However, the first set of circuitry 402' includes additional switches and capacitors than the first set of circuitry 402 in the circuit 400. For example, the first set of circuitry 402' includes m "legs" in parallel (each "leg" consisting of a switch in series with a capacitor), m switches in series with the m capacitors and the switch $S_{11}$ in parallel with the m "legs". Each of the m capacitors have equal capacitance. The energy buffering ratio for the circuit 400' is given by:

$$\Upsilon_b = \frac{[(1+R_v)^2 - (1-mR_V)^2]C_1 + (mR_v)^2}{C_1(1+R_v)^2 + C_2(1+2^2+\ldots+m^2)R_v^2}$$

where $R_v$ is the voltage ripple ratio (=0.5 $(V_{max}-V_{min})/V_{nom}$, $C_1$ is the capacitance of the capacitor $C_{11}$ and $C_2$ is the capacitance of one of the m capacitors each (which have equal capacitance).

Figure 10:
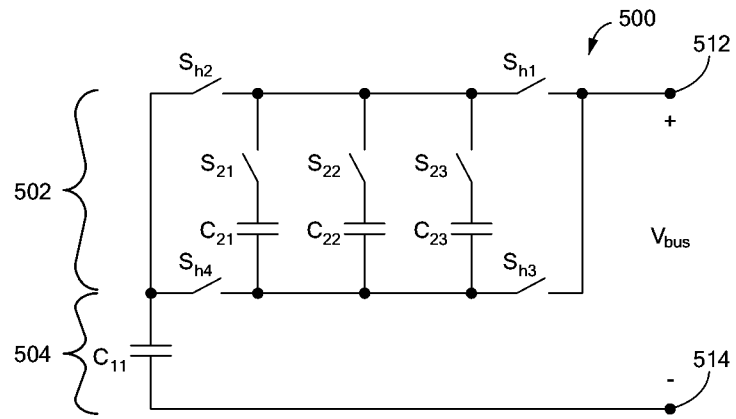
FIG. 10 is a circuit diagram of an example of the SSC energy buffer circuit of FIG. 2 called a 1-3 bipolar SSC energy buffer circuit.

Referring to FIG. 10, another type of SSC energy buffer circuit is a circuit 500 called a 1-3 bipolar SSC energy buffer circuit. Film capacitors are bipolar and can be charged in either direction. The circuit 500 takes advantage of this fact and thus improves the topology and operating strategy in order to push the energy buffering ratio, $\gamma_b$, even higher.

The circuit 500 includes a first set of circuitry 502 and a second set of circuitry 504. The first set of circuitry 502 includes 3 "legs" in parallel and switches $S_{21}$, $S_{22}$ and $S_{23}$ in series with a respective one capacitor $C_{21}$, $C_{22}$, $C_{23}$, each set forming one leg. The first set of circuitry 502 also includes switches $S_{h1}$, $S_{h2}$, $S_{h3}$, $S_{h4}$ (e.g., an H-bridge). The second set of circuitry 504 includes a capacitor, $C_{11}$. The capacitors $C_{11}$, $C_{21}$, $C_{22}$, $C_{23}$ have identical capacitance values. The voltage ratings for the capacitors $C_{11}$, $C_{21}$, $C_{22}$, $C_{23}$ are 11/8 $V_{nom}$, 3/8 $V_{nom}$, 2/8 $V_{nom}$ and 1/8 $V_{nom}$, and respectively. The main difference of this topology compared to unipolar one is that the four supporting capacitors are now put into the H-bridge to enable bi-directional charging. For operating strategy, pre-charging circuitry (not shown) ensures that specified initial voltages are placed on the capacitors $C_{11}$, $C_{21}$, $C_{22}$, $C_{23}$ are 5/8 $V_{nom}$, 2/8 $V_{nom}$, 1/8 $V_{nom}$, 0 respectively. At first, switches $S_{h1}$ and $S_{h4}$ are turned on and switches $S_{h2}$ and $S_{h3}$ are turned off. Then the circuit 500 operates as a unipolar buffer as described above until the voltage of the four capacitors $C_{11}$, $C_{21}$, $C_{22}$, $C_{23}$ reaches 3/8 $V_{nom}$, 2/8 $V_{nom}$, 1/8 $V_{nom}$, and $V_{nom}$, respectively. At this time, the switches $S_{h1}$ and $S_{h4}$ are turned off and the switches $S_{h2}$ and $S_{h3}$ are turned on, thus the voltages of the capacitors $C_{21}$, $C_{22}$, $C_{23}$ seen from the outside are reversed to −3/8 $V_{nom}$, −2/8 $V_{nom}$ and −1/8 $V_{nom}$, while the voltage of the capacitor, $C_{11}$, stays the same. After a similar process, the capacitors $C_{21}$, $C_{22}$, $C_{23}$ are charged back to −2/8 $V_{nom}$, −1/8 $V_{nom}$ and 0, respectively with the voltage of $C_{11}$ charged up to 11/8 $V_{nom}$.

After this, the discharging process begins and the capacitors $C_{21}$, $C_{22}$, $C_{23}$ are discharged down, flipped to a positive position and then discharged again while $C_{11}$ is all the way discharged back to 5/8 $V_{nom}$.

Figure 11:
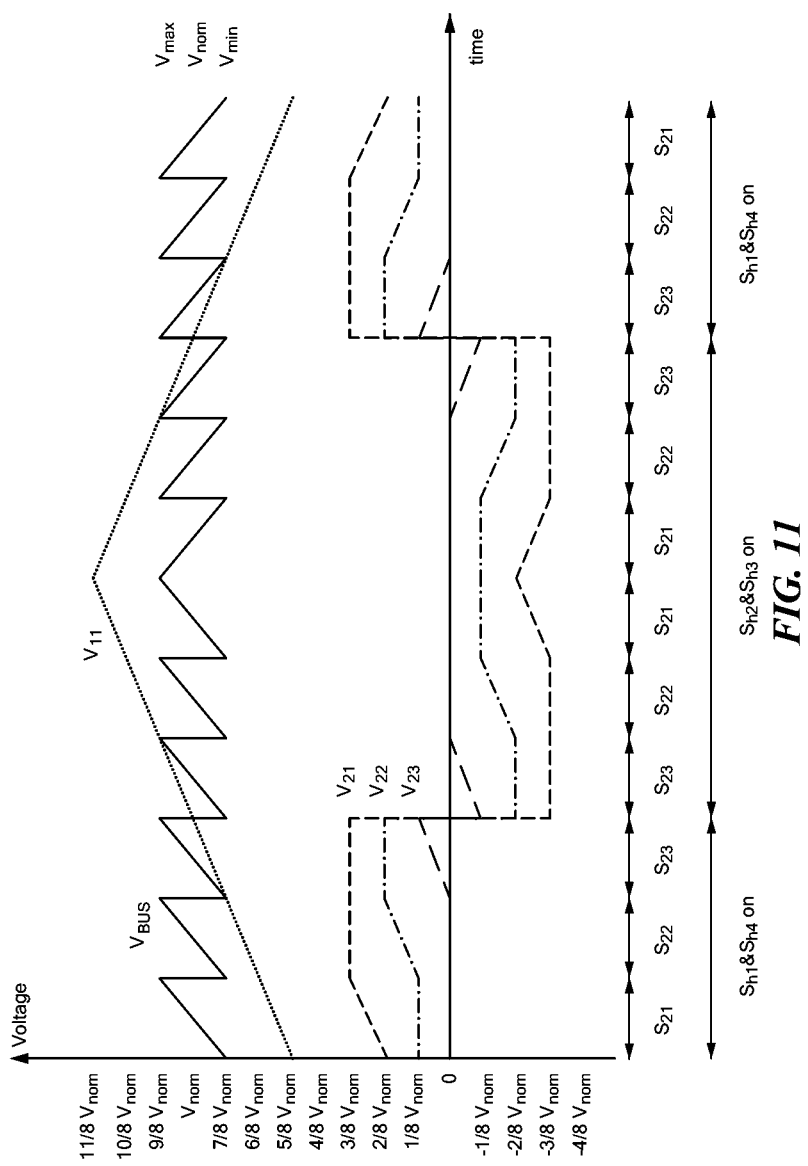
FIG. 11 is a plot of switch states vs. voltages of the circuit in FIG. 10.

Referring to FIG. 11, the waveforms of the voltage of each capacitor during a charging period are shown. As described above, by changing the switch configurations appropriately as energy is delivered to and from the buffer port, the individual capacitors can charge over a wide range (from their initial voltages to rated voltages), while the voltage at the buffer port is maintained within a narrow range (within 12.5% of $V_{nom}$). It can be shown that circuit 500 provides energy buffering of 71.1% of the peak energy storage rating of the capacitors, while providing a buffer port voltage, $V_{bus}$, that remains within ±12.5% of a nominal bus voltage, $V_{nom}$. While the energy buffering ratio, $\gamma_b$, of the circuit 500 is lower than that of the circuit 400 (i.e., 1-3 unipolar SSC energy buffer), the bipolar SSC energy buffer circuit with a slightly modified control and design methodology (as described further herein) increases its energy buffering ratio, $\gamma_b$, to 74%.

Figure 12:
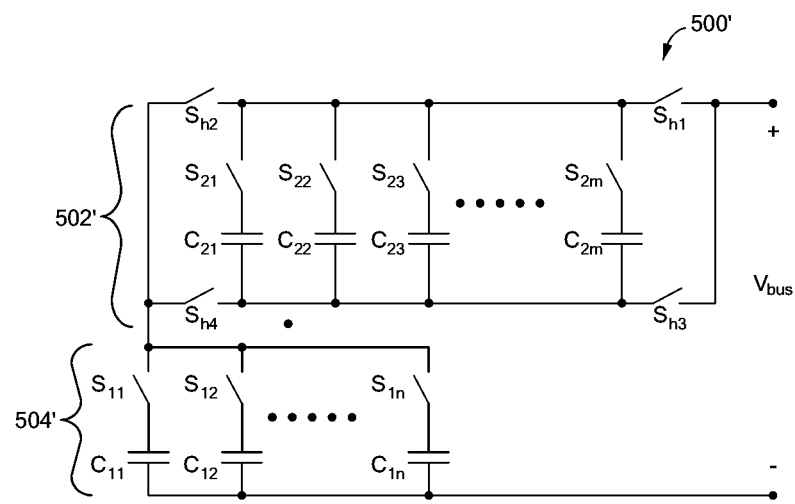
FIG. 12 is a circuit diagram of an example of the SSC energy buffer circuit of FIG. 2 called an n-m bipolar SSC energy buffer circuit.

Referring to FIG. 12, the circuit 500 can be extended by adding more capacitors to the first and second of circuitry, 502, 504 as in a circuit 500' called a n-m bipolar SSC energy buffer circuit. Note that the capacitor that does the energy buffering in the circuit 500 is the capacitor $C_{11}$ in the second set of circuitry 504. Therefore, by replacing C11 alone with a plurality of "legs" in parallel, each "leg" comprising the series connection of a capacitor and switch, better buffering performance can be achieved.

The circuit 500' includes a first set of circuitry 502' and a second set of circuitry 504'. The first set of circuitry 502' includes capacitors $C_{21}$, $C_{22}$, ..., $C_{2m}$ (referred herein as m capacitors) and switches $S_{21}$, $S_{22}$, ..., $S_{2m}$ in series with a respective one capacitor, and the "legs" formed by each switch-capacitor pair in parallel. The first set of circuitry 502' also includes switches $S_{h1}$, $S_{h2}$, $S_{h3}$, $S_{h4}$ (e.g., an H-bridge). The second set of circuitry 504 includes capacitors $C_{11}$, $C_{12}$, ..., $C_{1n}$ (referred herein as n capacitors) and switches $S_{11}$, $S_{12}$, ..., $S_{1n}$ in series with a respective one capacitor, and the "legs" formed by each switch-capacitor pair in parallel.

The m capacitors in the first set of circuitry 502 in this case have to switch at a higher switching frequency. The energy buffering ratio for this n-m bipolar SSC energy buffer (with n capacitors of equal value $C_1$ and m capacitors with equal value $C_2$) is given by:

$$\Upsilon_b = \frac{nC_1\left[\left(1+2mR_v\frac{C_2}{C_1+C_2}\right)^2 - \left(1-2mR_v\frac{C_2}{C_1+C_2}\right)^2\right]}{nC_1\left[\left(1+2mR_v\frac{C_2}{C_1+C_2}\right)^2 - C_2(1+2^2+\ldots+m^2)R_v^2\right]}$$

Figure 13:
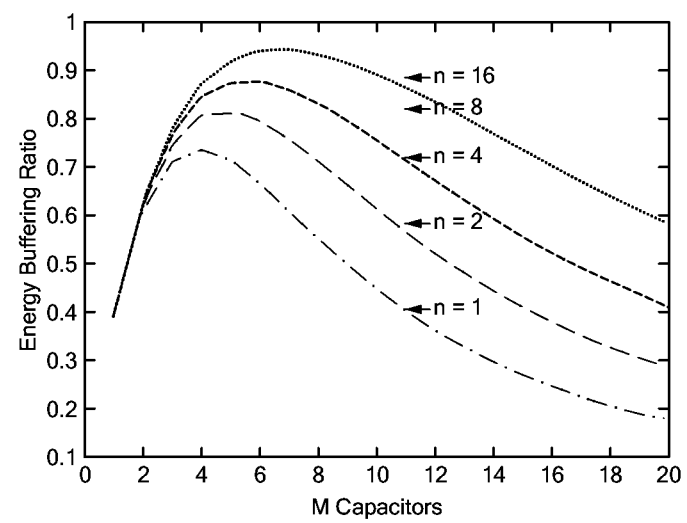
FIG. 13 is a plot of energy buffering ratio versus a number of m capacitors with a voltage ripple ratio of 12.5% for different numbers of n capacitors.

Referring to FIG. 13, the variation in energy buffering ratio, $\gamma_b$, as a function of the number of n capacitors and number of m capacitors is shown. FIG. 13 indicates that there is an optimal number of m capacitors that should be used for a given number of n capacitors in order to maximize the energy buffering ratio, $\gamma_b$. Note that this optimal number of m capacitors depends on the value of allowed voltage ripple ratio, $R_v$. In FIG. 13, the voltage ripple ratio, $R_v$, is 12.5%.

Figure 14A:
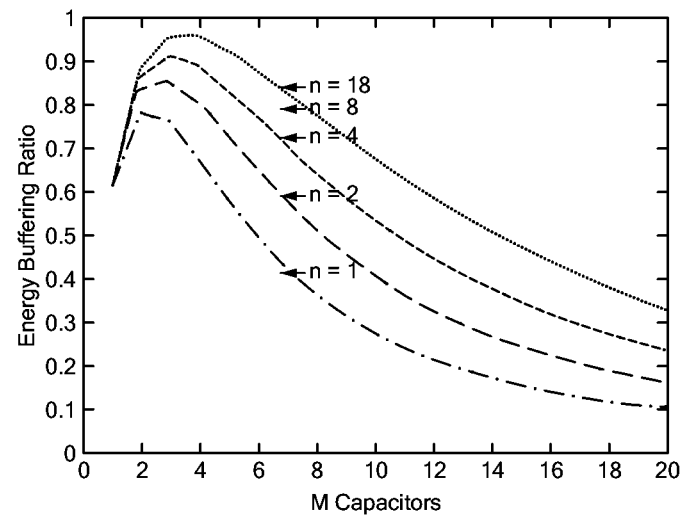
FIG. 14A is a plot of energy buffering ratio versus a number of m capacitors with a voltage ripple ratio of 25% for different numbers of n capacitors.
Figure 14B:
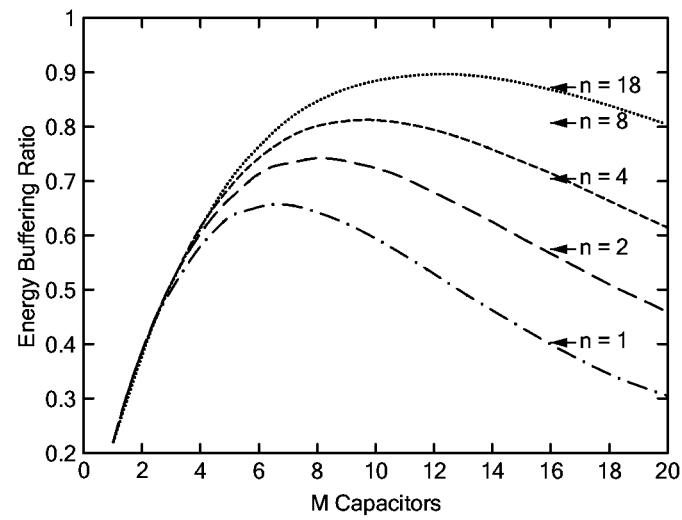
FIG. 14B is a plot of energy buffering ratio versus a number of m capacitors with a voltage ripple ratio of 6.25% for different numbers of n capacitors.

FIGS. 14A and 14B show how the optimal number of m capacitors changes as the allowed voltage ripple ratio, $R_v$, is changed. FIG. 14A has a voltage ripple ration, $R_v$, of 25%. FIG. 14A has a voltage ripple ratio, $R_v$, of 6.25%. If a larger voltage ripple ratio, $R_v$, is allowed a higher energy buffering ratio, $\gamma_b$, can be achieved with fewer m capacitors. On the other hand, a lower voltage ripple, $R_v$, requires a larger number of m capacitors if maximum energy buffering is to be achieved. However, increasing the number of m capacitors also increases the complexity of the circuit. Therefore the number of m capacitors to use can be determined by an appropriate trade-off between voltage variation and energy buffering ratio, $\gamma_b$.

Figure 15:
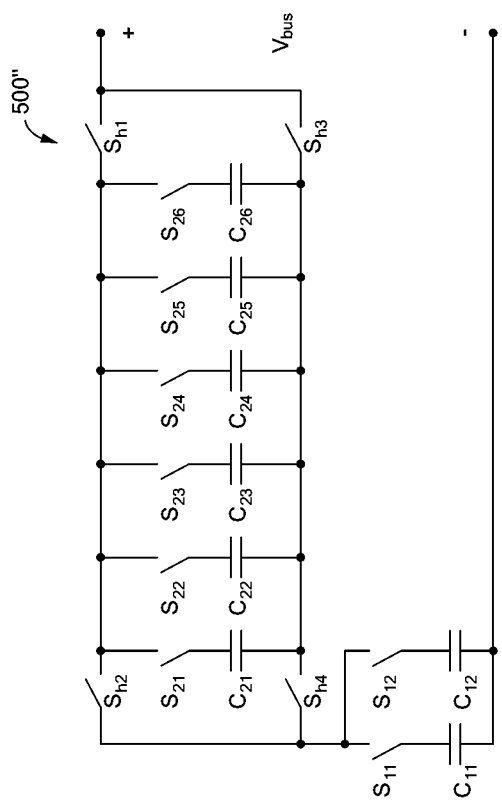
FIG. 15 is a circuit diagram of another example of the SSC energy buffer circuit called a 2-6 bipolar SSC energy buffer circuit.

Referring now to FIG. 15, one particular example of the circuit 500' is a circuit 500' where n=2 and m=6 also called a 2-6 bipolar stacked switched capacitor energy buffer circuit.

Exemplary circuit 500' includes a first block of parallel coupled switches and capacitors S11, C11, S12, C12 and a second block of parallel coupled switches and capacitors S21, C21, S22, C22, S23, C23, S24, C24, S25, C25, S26, C26. The first and second blocks are coupled in series across a bus voltage $V_{bus}$. Switches Sh1, Sh2, Sh3, Sh4 are disposed in the second block to provide selected signal paths between the first and second blocks.

As noted above, the capacitors are preferably of a type that can be efficiently charged and discharged over a wide voltage range (e.g., film capacitors). The switches are disposed to selectively couple the capacitors to enable dynamic reconfiguration of both the interconnection among the capacitors and their connection to a buffer port. The switches are cooperatively operated as a switching network such that the voltage seen at the buffer port varies only over a small range as the capacitors charge and discharge over a wide range to buffer energy.

By appropriately modifying switch states of the SSC energy buffer circuit, the SSC energy buffer circuit absorbs and delivers energy over a wide individual voltage range, while maintaining a narrow-range voltage at the input port. This enables maximal utilization of the energy storage capability.

Figure 16:
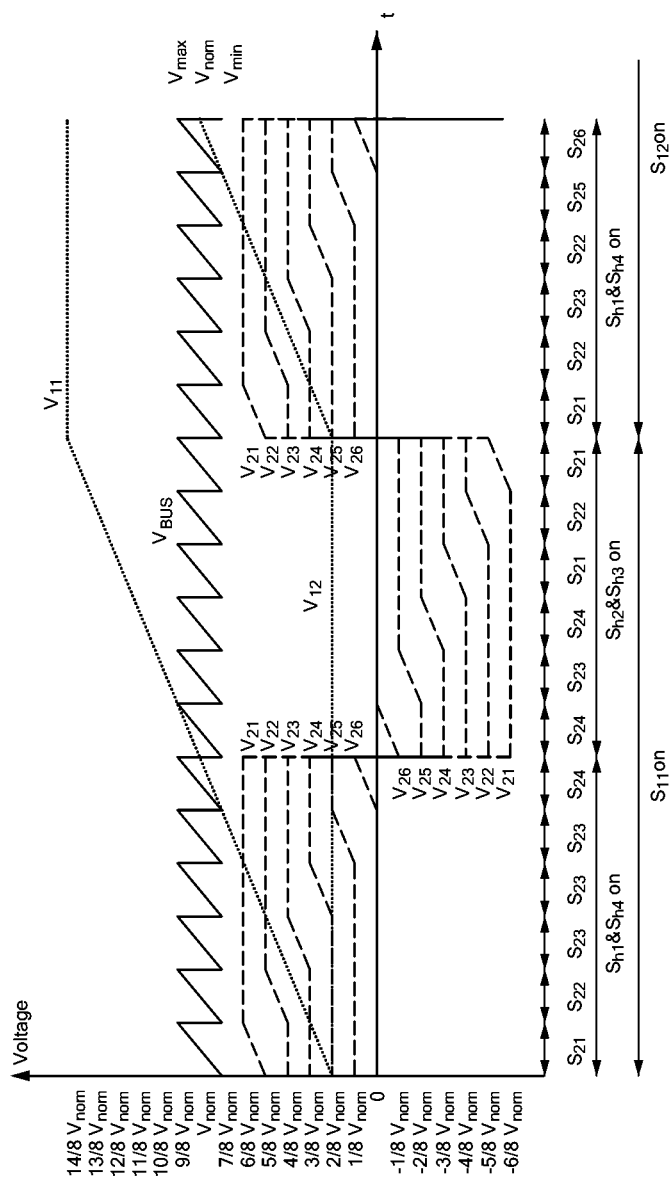
FIG. 16 is a plot of switch states vs. voltages of the circuit in FIG. 15.

The waveforms associated with the circuit 500" are shown in FIG. 16.

Referring now to FIG. 16, a plot of switching states vs. voltage is shown for the circuit 500" (FIG. 15).

The bipolar stacked switched capacitor energy buffer circuit (e.g., the circuit 500') previously described can also be controlled in a slightly different manner. Instead of charging the n capacitors only in series with the m capacitors, a state can be introduced by turning $S_{h3}$ and $S_{h4}$ (or $S_{h1}$ and $S_{h2}$) on at the same time in which the n capacitor is charged directly. An example of the modified control is shown in FIG. 5 for the circuit 300 (the 2-4 bipolar SSC energy buffer circuit) of FIG. 4. The modified control is described herein in the section entitled: "Enhanced Bipolar Stacked Switched Capacitor Energy Buffer"]. With this modified control, and assuming that all m and n capacitors have the same capacitance, the expression for energy buffering ratio, $\gamma_b$ becomes:

$$\Upsilon_b = \frac{n[(1 + (m+1)R_v)^2 - (1 - (m+1)R_v)^2]}{n[(1 + (m+1)R_v)^2 - (2^2 + 3^3 + \ldots + (m+1)^2)R_v^2)]}$$

Figure 17:
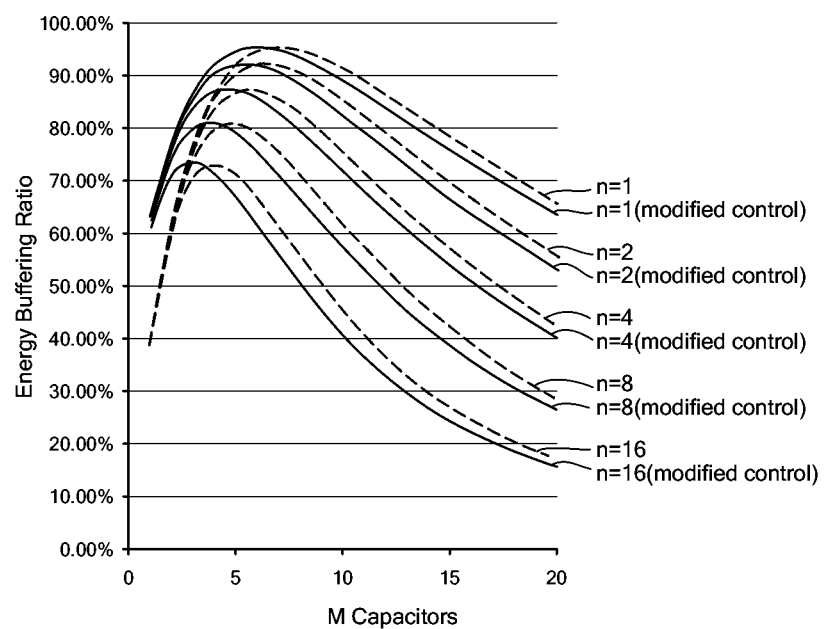
FIG. 17 is a plot of energy buffering ratio versus and the number of m capacitors for different numbers of n capacitors and whether under modified control.

This is plotted as a function of number of n capacitors and number of m capacitors in FIG. 17. FIG. 17 also plots (as dashed lines) the energy buffering ratio without modified control. The modified control achieves higher maximum energy buffering ratio than without the modified control. Furthermore, it achieves this higher maximum with fewer m capacitors than without modified control.

The techniques described herein are not limited to the specific embodiments described. Elements of different embodiments described herein may be combined to form other embodiments not specifically set forth above. Other embodiments not specifically described herein are also within the scope of the following claims.

What is claimed is:

1. A stacked switched capacitor (SSC) energy buffer circuit comprising:
two sub-circuits having terminals that are serially coupled during a first operating mode wherein each sub-circuit comprises one or more capacitors, and at least one sub-circuit further comprises a plurality of switches disposed and operable to selectively couple the one or more capacitors of the at least one sub-circuit to: (a) enable dynamic reconfiguration of how the one or more capacitors of the at least one sub-circuit are coupled to the terminals of the at least one sub-circuit; and (b) dynamically reconfigure one or more interconnections among the one or more capacitors within the at least one sub-circuit; wherein the SSC energy buffer circuit provides a total peak energy buffering capability and wherein the peak energy buffered by one of the two sub-circuits is greater than 66% of the total peak energy buffering capability of the SSC energy buffer circuit.

2. The SSC energy buffer circuit of claim 1 wherein the switches in at least one of the two sub-circuits are arranged to dynamically reconfigure a polarity with which at least one capacitor is connected to the terminals of the sub-circuit.

3. The SSC energy buffer circuit of claim 1, further comprising a pre-charge circuit coupled to each of the two sub-circuits said pre-charge circuit operable to charge each of the one or more capacitors in the two sub-circuits to specified initial conditions before entering the first operating mode.

4. The SSC energy buffer circuit of claim 1 wherein at least one subcircuit comprises a plurality of sub-sub-circuits connected in parallel, wherein each sub-sub-circuit comprises a switch serially coupled to a capacitor.

5. The SSC energy buffer circuit of claim 1 wherein the one or more capacitors in at least one of the two sub-circuits are of a type that are configured to be charged and discharged over a voltage range within about 72% of a nominal voltage.

6. The SSC energy buffer circuit of claim 1 wherein the one or more capacitors in at least one of the two sub-circuits are provided as: one of film capacitors, ultra capacitors and electrolytic capacitors.

7. The SSC energy buffer circuit of claim 1 further comprising an energy buffer port wherein the plurality of switches of at least one of the two sub-circuits are disposed and operable to selectively couple the one or more capacitors of the at least one of the two sub-circuits to enable dynamic reconfiguration of both the one or more interconnections among the capacitors and their connection to the energy buffer port.

8. The SSC energy buffer circuit of claim 7 wherein the plurality of switches of at least one of the two sub-circuits are disposed and operable to cooperatively operate as a switching network such that a voltage at the energy buffer port varies about 12.5% or less as the capacitors charge and discharge up to a voltage range of about 72% of their peak energy storage rating.

* * * * *